UNITED STATES PATENT OFFICE.

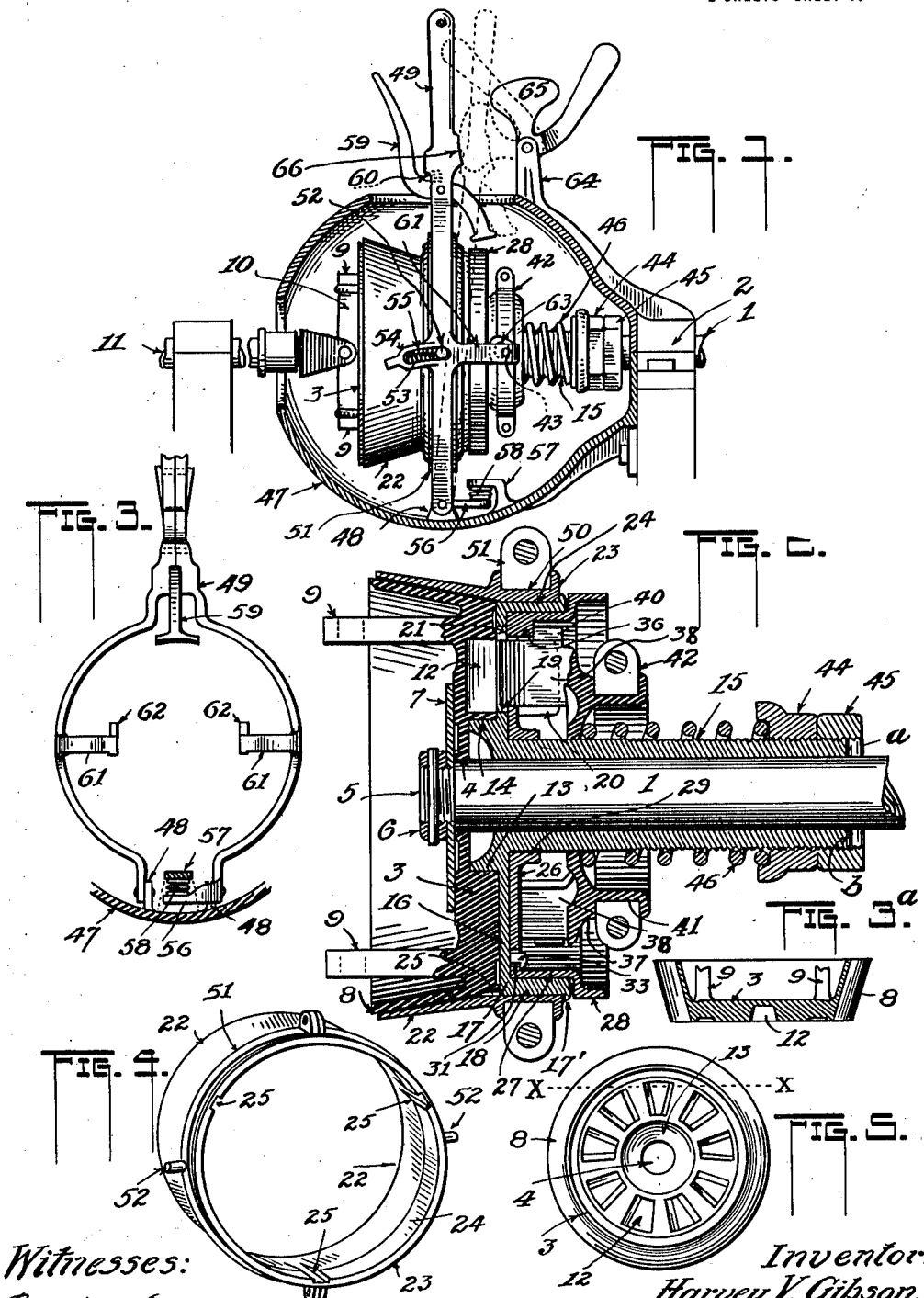

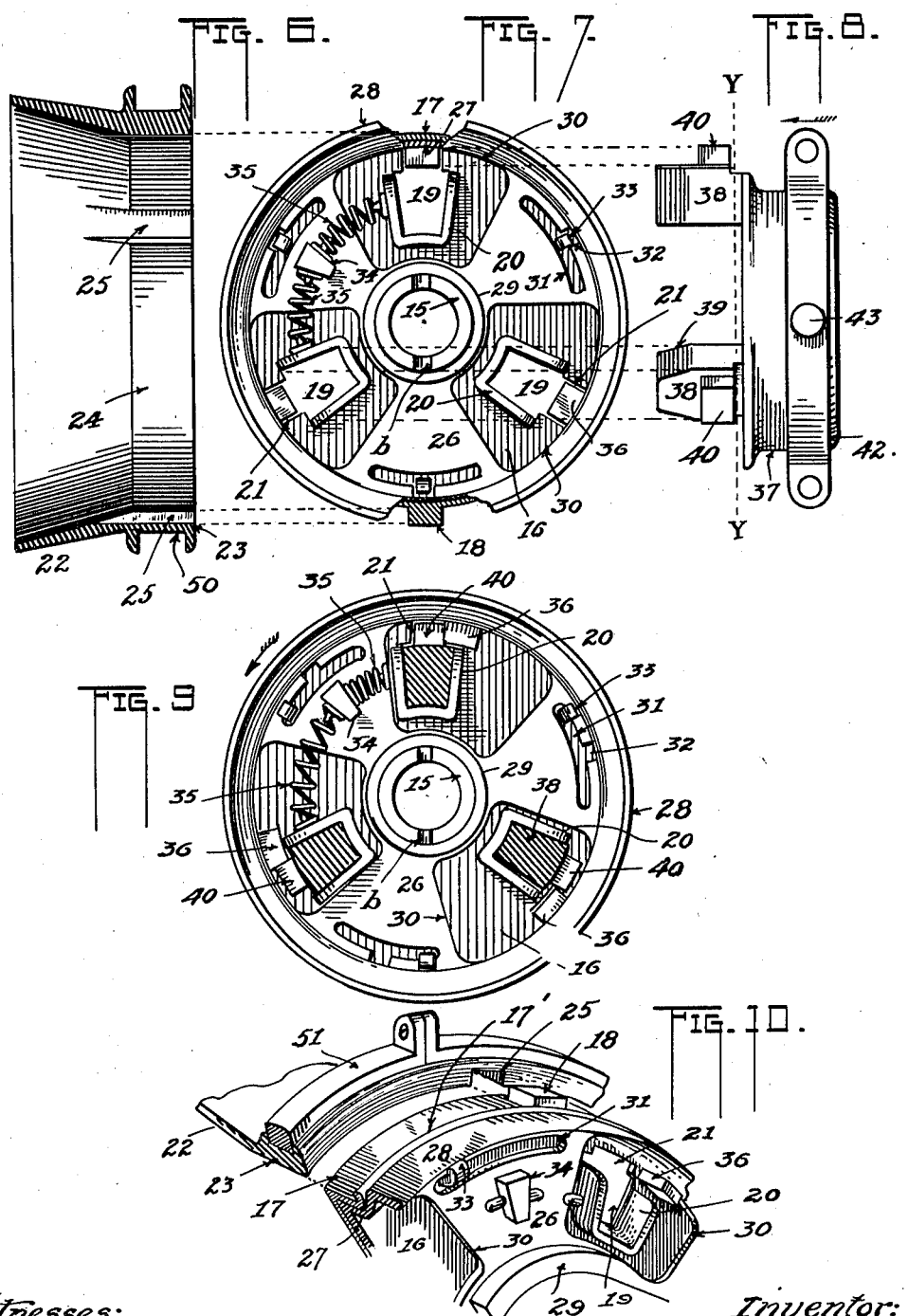

HARVEY V. GIBSON, OF PEORIA, ILLINOIS.

CLUTCH.

1,270,721.  Specification of Letters Patent.  Patented June 25, 1918.

Application filed February 15, 1916. Serial No. 78,528.

*To all whom it may concern:*

Be it known that I, HARVEY V. GIBSON, citizen of the United States, residing at Peoria, in the county of Peoria and State of Illinois, have invented certain new and useful Improvements in Clutches; and I do hereby declare that the following is a full, clear, and exact description of the invention, which will enable others skilled in the art to which it appertains to make and use the same.

This invention relates to improvements in clutches particularly of the type used between a power member and a driven member and in which parts are adapted to be automatically separated under overload.

In so far as I am aware, clutches heretofore have not been so constructed as to automatically separate under overload in either direction of rotation. The present invention, therefore, relates to a clutch that will carry a certain definite or predetermined load and which after the load has increased beyond said predetermined one at which time damage is likely to result to the driven machine parts, the clutch parts will be automatically disengaged, this result obtaining during either direction of rotation of said clutch.

Again, except as to the devices shown in my Letters Patent Nos. 1,208,135 and 1,208,136 issued Dec. 12, 1916, it has been necessary heretofore to stop the power which operates the driving part of a clutch after disengagement has taken place so that the clutch parts can be reëngaged.

As distinguished from the prior art in clutches and as differing from said patents, there is provided in the present invention certain parts to engage by friction whereby the load can be gradually taken up without jar or shock to the driving parts, the positive engagement of the clutch parts being accomplished after the speed of rotation of the part carrying the load approximates that of the power.

One of the objects of the invention is to provide a clutch rotatable in either direction and whose parts can automatically engage and disengage during either direction of their rotation and in which the driving relation of said parts can be restored at will during either direction of rotation.

Another object is to provide a clutch rotatable in either direction whose parts can be made to positively engage and disengage without resorting to change in the position or relation of said parts.

Another object is to provide a form of clutch whose parts will be disengaged or separated under overload and to combine with the same a friction clutch by which the load may be gradually taken up without jar after the driven element has been restored to its proper running condition whereupon the main or what I shall term the "positive clutch" is "thrown in" to carry the load.

Still another object is to provide a structure in a clutch wherein the load under certain conditions may be carried by friction alone, the required amount of friction for a given load being obtained by certain parts.

Another object is to improve upon the structures of the patents above mentioned.

Other objects and advantages will appear herein as the description proceeds.

To the end that the invention may be understood, I have provided the accompanying drawings, in which, Figure 1 is a side elevation of the complete clutch showing an inclosing shell in section.

Fig. 2 is a longitudinal section of the clutch.

Fig. 3 is a front elevation of a lever for operating certain portions of the clutch during its rotation.

Fig. 3ª is a section of a certain clutch part shown in Fig. 5 taken on line X—X of that figure.

Fig. 4 is a friction cone shown in perspective.

Fig. 5 is an elevation of one of the clutch parts.

Fig. 6 is a longitudinal section of the friction cone shown in Fig. 4.

Fig. 7 is a front elevation of portions of the clutch from which other parts are removed.

Fig. 8 is a side elevation of a ring showing extensions thereon to engage certain parts shown in Fig. 7.

Fig. 9 is a view similar to Fig. 7, showing slightly altered positions of the parts relatively, other parts illustrated therein being in section on line Y—Y, Fig. 8; and, Fig. 10 shows, in perspective, parts of the clutch forming the subject of my invention.

1 indicates a shaft which may be connected with the driving power (not shown) and 2 indicates a bearing for the same. The extremity of the shaft outside the described bearing carries the clutch mechanism forming the subject of the present invention.

3 is a member clearly shown in Fig. 2 in section, and in Fig. 5 which indicates its inner surface, which is mounted upon the shaft. It has a central bore 4 which receives the end of said shaft, the latter being reduced in diameter as at 5 which is threaded to receive a retaining nut 6, for said member 3, there being a plate 7 between the nut and the resulting shoulder of the shaft created by reducing the latter against which the described member 3 is adapted to bear.

Said member 3 is provided with an outwardly flared surface 8 forming a friction cone and its rear surface is furnished with two extensions 9 between which is pivoted a universal joint or knuckle 10 to which may be attached a shaft 11, for example, for driving any form of power. However, the shaft 11 may be secured directly to said member 3 if desired. The inner face of said member is furnished with a series of sockets 12 radiating from the center of its rotation as clearly shown in Fig. 5, the sides of said sockets being beveled, as shown in Fig. 3ª. Centrally of the member concentric to the inner bore 4 is a depression 13.

14 is a projection of a member which comprises a sleeve-portion 15 threaded exteriorly and affixed to the shaft 1 by means of a pin $a$, for example, extending through the shaft and lying in a groove $b$ on the end of said sleeve. There is included with the sleeve 15 a flange 16 which abuts upon the face of the said member 3. Said flange 16 includes a rearwardly extending flange 17 having a cylindrically curved outer surface clearly shown in Fig. 10 provided with a lug 18 at one or more points, the said flange 17 terminating in an outwardly projecting annular flange 17′.

In addition, the flange 16 is provided with one or more spaced radial openings 19 all of which are spaced equally from the center of rotation and lying opposite the circular row of sockets of the member 3. Extending from the flange at each opening is a wall or flange 20 preferably extending around said opening at three sides. The distance between the inner surfaces of opposite portions of each flange is equal to the width of the openings 19, the flanges forming open tubes as guides for certain fingers to be described presently. The said openings 19 at their margins farthest from the shaft 1 are extended beyond the outermost line of the sockets as indicated at 21, shown particularly in Figs. 2 and 7, the purpose of which will appear as the description proceeds.

22 is a friction cone whose inner surface is adapted to engage the cone 8 above described. Said cone 22 includes a portion 23 having a cylindrical bore 24 in which the previously described flange 17 is slidable, the described lugs 18 being adapted to enter correspondingly spaced grooves 25 in the wall of said bore 24.

Mounted upon the sleeve 15 so as to rock axially relatively thereto is a plate 26 having a flange 27 terminating in a friction drum or band 28 outside the flange 17, 17′, adapted to be engaged by a trip or lever to be described presently. Said plate 26 abuts upon the plate 16 and preferably has a flange 29 to provide a wide bearing surface upon the said sleeve 15. As clearly shown in Figs. 7, 9 and 10 said plate is provided with openings 30 through which the described flanges 20 extend. Between the openings 30 the resulting segment-like portions of the plate 26 are provided with slots 31 arranged concentrically to the axis of the shaft 1. Outward from and communicating with each of these slots are notches 32 and extending from the surface of the plate 16 through each slot 31 is a hook 33 adapted as shown in Figs. 2 and 9 to overlie the plate at said slots, the notches 32 permitting the hooks to pass through for allowing the plates 16 and 26 to come together in the assembling operation, see Fig. 7. This arrangement prevents the separation of the two described plates while in service, i. e. while the clutch parts are in driving relation.

On the plate 26 between two of the flanges 20 is a lug 34 and between said lug and the flange at each side of it are springs 35, one acting in opposition to the other.

The inner surface of the flange 27 of the plate 26 has lugs 36 each of which normally lies opposite the extended notches 21 of the openings 19 in the flange 16 as illustrated in Fig. 7.

37 is a ring provided on one side with a series of fingers 38, Fig. 8, beveled at opposite sides at 39 at substantially the same angle as the beveled walls of the sockets 12 with which they engage, each finger being adapted to slide within and to be guided by the flanges 20 described, Fig. 9. Said fingers are each provided on their outer surfaces with a projecting lug 40 adapted to lie either upon or against the lugs 36, just mentioned, or at either side of the same as will presently appear. The said ring 37 is grooved at 41, Fig. 2, and receives a two-part band 42 having at diametrically opposite sides a trunnion 43, but one of which is shown, see Figs. 1 and 8.

44 is a nut on the sleeve 15 and adjustable thereon by means of the engaging threads on each, 45 being a lock-nut to secure the nut 44 in a desired adjustment. 46 is a spring interposed between the nut 44 and the described ring 37 and adapted to maintain constant pressure upon the latter in the direction of the member 3 with which said fingers 38 engage in practice.

47 is a shell preferably made in two parts and preferably integral with the usual two parts of the described bearing 2, the two portions of the shell separating along the line of separation of the parts of said bearing. The shell is open at its top through which extends a lever mechanism now to be described, and it is also open at one side for the shaft 11. 48 is a pair of lugs upstanding from the lower inner surface of the shell, Fig. 3, to each of which is pivoted the lower end of one half of a lever 49. This lever is in the form of a ring so as to encircle the mechanism described and particularly the portion 23 of the cone 22 which is provided with a groove 50 receiving a split band 51 provided with opposite trunnions 52. The latter extend through slots 53 in opposite halves of said lever 49, but one of which slots being shown, Fig. 1, the said lever having an extension 54 in which said slots are formed. A spring 55 lies in each slot and is compressed between the trunnions 52 and a part of the lever at the end of said slot. The lower end of the one of the halves of the lever is furnished with an extension 56 between which and the end of an upstanding lug 57 of the shell 47 is a spring 58. Pivoted in the upper portion of the lever 49 is a lever 59 adapted at one end to frictionally engage the drum 28, there being a spring at 60 to maintain the said lever 59 in the position shown in full lines in Fig. 1. In addition, the lever 49 is provided at those portions having the extensions 54 with forwardly extending arms 61. These are recurved at 62, Fig. 1, and lie at diametrically opposite sides of the band 42 of the ring 37, each being slotted at 63 to receive the described trunnions 43 of said band. Upstanding from the top of the shell 47 is an arm 64 pivotally carrying a cam 65, the front side of the lever 49 presenting a surface 66 to receive said cam as indicated by dotted lines.

Either of the shafts 1 or 11 may be the driving member and the other may be the driven as will be more fully stated at the end of the specification, but for the purpose of this description, the shaft 1 will be considered the driver. In the position of the parts shown in Fig. 2 in which the fingers 38 are removed from and lie outside of the sockets 12, and in fact free of the member 3, the shaft 1 is free to rotate together with all of the parts mounted thereon, the only stationary part being the cone-member 3, but when said fingers 38 lie within the sockets 12 the rotation of the shaft 1 will rotate the shaft 11.

Since the purpose of my device, as with those of my issued patents referred to, is to automatically terminate the rotation of the driven elements, in this case the shaft 11, when overloaded beyond a predetermined point, the spring 46 is so adjusted through the nut 44 that the clutch portions constituted by the socketed member 3 and the ring having the fingers 38 in conjunction with the plate 26 will effect such separation under overload. These parts will maintain the separated relation of the shafts until such time as the operator restores the driving relation after the cause of the overload has been removed. Let it be supposed that the clutch is in action driving the shaft 11.

Fig. 9 shows the fingers 38 in section on the dotted line Y—Y, Fig. 8. The lugs 40 of said fingers lie at one side of and against one side of the lugs 36. In this position the plate 26 and its friction drum 28 has been shifted or rocked on the sleeve 15 against one of the springs 35 to remove the said lugs 36 from their position opposite the extended portions 21 of the opening 19 as viewed in Fig. 7, wherein they are there held by both springs 35. These lugs 36 have therefore been lying behind said lugs 40, see Fig. 2, preventing the fingers entering the sockets 12, in opposition to the pressure of the described spring 46.

As the load on the shaft 11 and consequently on the cone-member 3 becomes greater than that for which the said spring 46 is set, the rotation of 3 being retarded causes the fingers 38 to be forced out of the sockets 12, due to the inclined or beveled surfaces of said sockets and said fingers in opposition to the spring 46. As this takes place the lugs 40 of the latter are forced out of the plane of the lugs 36, Fig. 2, whereupon the spring 35 which has been under compression, Fig. 9, is permitted to assert itself bringing the plate 26 and said lugs 36 back to the normal position, Fig. 7, behind the said lugs 40 so that the fingers are held disengaged.

This relation exists until certain operations now to be described again rocks the ring in either direction to permit the fingers to reëngage.

Upon restoring the driven machinery to proper running condition the operator grasps the lever 49 and forces it toward the cone 8 from its normal position shown in continuous lines in Fig. 1. Through the trunnions 52 and the band 51 the cone 22 is forced upon the said cone 8 so as to gradually take up the load. After said load is being carried at substantially the same rate of speed as that of the driving shaft the lever 59 is grasped and forced upon the friction drum 28. As the latter rotates with the clutch and yet can rock relatively to the same it is retarded slightly in its rotation with the result that the lugs 36 are shifted from behind the lugs 40 of the fingers, and the spring 46 is thus enabled to assert itself and thereby force the fingers into engagement with the sockets 12. In this described operation the device as viewed in Fig. 9 may be considered as rotating in the direction of the arrow or contrary clockwise. It will be clear, therefore, that to engage the friction band in the manner described, the movement of the lugs 36 will be accomplished. However, should the clutch rotate in an opposite direction exactly the opposite operation will take place when friction is placed upon the said friction band. That is to say, the lugs 40 will then take up a position at the opposite sides of the lugs 36 since the latter will be moved to the opposite position from that shown in Fig. 9 due to friction on the drum 28. Thus it will be seen that whereas in the devices of my mentioned patents wherein a change is required in the parts after separating the portions of the clutch in order to adapt it for use in either direction of rotation the device herein requires no such changes but is ready at any time to operate in either direction. Therefore, it may be placed on any machine no matter in what position or relation and requires no attention, being entirely automatic in the locking-out feature and in its reëngagement after the manual operation of the levers 49, 59.

The broken lines in Fig. 1 show the lever 49 moved toward the shaft 1. This indicates the action of the lever when it is desired to manually disengage the fingers 38 and thus terminate the rotation of the driven machine manually. The recurved portions 62 of the lever which engages the trunnions 43 moves the ring 37 and its fingers against the spring 46 whereupon the plate 26 and its lugs 36 are moved into the path of the said lugs 40 as explained.

The spring 58 is for holding the cone 22 or rather its portion 23 against the annular flange 17' of the flange 17 which is the limit for the greatest separation of the cones and the springs 55 are provided for holding the lever 49 in its normal position against the trunnions 52 of the band 51 ready to bring the two cones together.

One of the objects of the invention, as already explained, is to carry the load of the driven machinery without respect to the clutch parts 3 and fingers 38. That is to say, after the spring 46 has been so adjusted that a certain predetermined load can be carried, and where it is the wish to carry a still greater load for a time in addition, or even a load without requiring adjustment of said spring for such added or lesser load I have provided the cam 65. This in its normal position, full lines, does not interfere with the operation of the lever 49 for the manual disengagement of the clutch parts, but when moved to the position shown in broken lines the cam can be forced against the surface 66 of said lever so as to force the cones 8 and 22 into driving engagement. The surface of the cam is described from a point offset from its pivot so that as it is forced more and more against the lever, the latter carries the cones more firmly into frictional engagement to maintain the driving relation, but the cones may slip when an excess load is placed upon them and danger of breakage or disarrangement of the parts of the whole mechanism is avoided.

Where large cone surfaces are used, as herein, widely varying loads can be taken up and carried by friction alone. That is to say, when adapting the clutch to various uses, wherein the loads to be carried may widely vary, the cam 65 may be set up against the lever to hold the cones in driving engagement, the pressure of the cam on the lever can be such that the cones will carry the required load, but will just slip when the load becomes excessive or so as to be dangerous to the machine parts. Where a lever is held positively by a latch, the proper degree or varying degrees of frictional engagement cannot be provided for. The cam, however, can be adjusted to any one of an infinite number of loads which is most desirable, which desire is wholly realized herein.

It is more or less difficult to speedily adjust the spring 46 to carry different loads without some experiment or trial so that after it has once been adjusted for a given load it is preferable to keep that adjustment and use the friction cones and afterward when the special work is done the ordinary load may be again carried by the clutch.

Though not shown it is preferable to provide an opening in the shell 47 through which the nuts 44 and 45 may be reached, said shell being otherwise closed except as to the openings mentioned earlier herein. There will thus be no danger of articles being drawn into the rotating parts and causing trouble.

Since the lugs 18 of the flange 17 lie at all times in the notches 25 of the cone 22, the latter may be shifted while constantly maintaining driving relation with the sleeve 15 and its parts. The extensions 21 of the openings 19 in the flange 16 are merely provided so that in the movements of the fingers 38 there will be no chance interference of any parts of said flange 16 with the lugs 40 in the reëngaging operation of the clutch parts.

It is understood that in the position of the lever 49 shown the cone-member 3 and the cone 22 are at their most widely separated positions so that no friction exists at any time. It is only when the lever is moved to take up the load by friction that the cones can engage.

The rotative movement of the plate 26 upon the sleeve 15 may be limited in either direction of its movement due to the frictional engagement of the lever 59 by any suitable means, but in the present instance the fully compressed condition of either one of the springs 35 as shown in Fig. 9, will act as the limiting portion, or the segments of the plate 26 may strike upon the flanges 20 or both. However, the important point is that the lugs 36 will be moved far enough in this slight rotative movement so that they will readily permit the free return of the fingers into the sockets.

It has been stated that either shaft 1, 11, may be the driving or driven member. That is to say, the shaft 1 may be connected to the power and the shaft 11 to the driven element, or vice versa, and the load can be taken up by the lever under either of these conditions. This is by reason of the fact that since each shaft has a friction cone rotatable with it and one of the cones is in rotation due to the continued drive from the power the other cone can be engaged and driven whereupon the trip lever 59, can engage the friction drum 28. In this respect again the present structure has an advantage over my mentioned devices of my former applications.

It is understood, of course, that if both clutch parts are at rest and the fingers happen to be disengaged said fingers may be allowed to readily reëngage by turning the friction drum 28 by hand to remove its lugs from behind those of said fingers. Evidently, if the sockets of the member 3 are not in register with the positions the fingers happen to be in it is only necessary to manually rotate one of the clutch parts in order to bring about the proper position for engagement of the fingers whereupon the attendant may start the power without the necessity of returning to the clutch especially when the power and the clutch happen to be in widely separated positions.

I wish to make it understood that it is not my wish nor design to be confined in any way to the exact structure or arrangement of the parts of my improved clutch, since minor changes may be made that will still lie within the meaning of the invention and the scope of the appended claims.

Having thus described my invention, I claim:—

1. In a clutch, the combination of two abutting clutch parts adapted to rotate relatively to one another and also adapted to be rotated in unison, one being a driving and the other a driven part, a member carried on one of the parts and rotated by it and adapted for movement in a direction parallel to the axis of its rotation and to engage the other of the parts and adapted and arranged whereby it is ejected therefrom under overload, means to elastically hold the member in engagement with said other part, means carried by and rotatable with one of the clutch parts and adapted for movement in either direction about the axis of rotation thereof and having a part adapted to engage and hold the member disengaged, elastic means acting on said means to hold it in the path of the member when it is in its ejected position, and adapted during either direction of its rotation to be retarded in its said rotation with the clutch to move it about the axis of the part of the clutch on which it is carried to release the member.

2. In a clutch, the combination of two rotatable parts, the axis of rotation of each being substantially coincident, a member mounted upon and rotated by one of the parts, the other of the parts adapted to receive said member and under overload to eject it, means constantly tending to force the member into engagement with said part, means rotatable with one of said parts and adapted for movement in either direction about the axis of rotation of the same and having an extension, a pair of opposed springs each engaging the said means and adapted to move the extension into a position behind the member when the same is ejected for holding said member in its ejected position, said means adapted when retarded in either direction of its rotation with the clutch to be moved out of the path of endwise movement of the member to allow it to reëngage to restore the driving relation of the clutch parts.

3. In a clutch, the combination of two clutch parts adapted to rotate together, one of them also adapted to rotate relatively to the other, a member mounted upon and rotatable with the other of them and adapted to have movement in a line with its axis of rotation and also adapted to be ejected under overload, means to elastically hold it in engagement with said other part, means mounted upon the part having said member and adapted to rotate therewith but arranged to have a movement in both directions relatively to it about its axis of rotation and including an extension to lie in the path of the member to hold it disengaged after its ejection, means to elastically hold the last named means substantially midway between its limits of rotative movement and with its extension in said path of movement of the member, and a manually operated part adapted to be moved into engagement with the said last named means to impart to it a movement relative to the part carrying it during either direction of rotation of said part to remove the extension from behind the member, and a friction device rotatable with each of the clutch parts adapted to be forced into engagement to take up the load, and a lever operatively engaging one of the parts to move it into driving engagement with the other.

4. In a clutch, the combination of two clutch parts adapted to rotate together, one of them being the driving and the other the driven part, and one also adapted to rotate relatively to the other, a member mounted upon and rotatable with one of them and adapted to have driving engagement with the other of them and adapted also to have movement in a direction parallel to its axis of rotation and to be disengaged under overload, means to elastically hold the member in engagement with said other part, means also mounted upon one of the parts adapted to rotate therewith and arranged to have a slight movement about its axis of rotation in either direction and including an extension to engage the member when ejected, means to elastically hold the last named means substantially midway between its limits of rotative movement with its part in said path of movement of the member, a friction device rotatable with each of the clutch parts, a lever operatively engaging the driving part and adapted to move it into frictional engagement with the other whereby to take up the load, and a lever mounted upon the first described lever adapted when the load has been taken up by friction to engage the means having the extension and to partially rotate it relative to the clutch part carrying it to shift its extension and release the said member for its reëngagement to carry the load.

5. In a clutch, the combination of a driving and a driven part each including a friction device adapted to be brought into frictional engagement, a member carried by and rotatable with one of the parts and adapted to engage the other of the parts, means to elastically maintain such engagement, said member adapted by its construction to be ejected against said means due to an overload imposed upon the clutch part with which it engages, means carried by one of the parts and rotatable therewith and adapted for a movement in either direction about the axis thereof and including an extension, means to elastically hold the last described means substantially midway between its limits of movement and with its extension in the path of the member when ejected, a lever operatively engaging one of the parts and adapted to move its friction portion into engagement with the other to gradually take up the load while the driving part is in constant rotation, and a lever adapted at will to engage the means having the extension and cause its movement relatively to the part carrying it to remove said extension from the path of the member and permit the reengagement of the same to carry the load.

6. In a clutch, the combination of two clutch parts each including an extending portion, one to be brought into frictional engagement with the other, a member to positively connect one of the parts with the other in driving engagement and adapted to be ejected from said part under an overload, means to maintain said member in its disengaged position, a lever operatively engaging one of the parts and adapted to move its frictional portion against the frictional portion of the other to take up the load, and means to engage and operate the first described means for permitting the member to reëngage and to carry the load after it has been taken up by the said friction portions.

7. In a clutch, the combination of two clutch parts, each including an extended portion adapted to be brought into frictional engagement whereby one is driven from the other, a member carried by one of the parts and adapted to engage the other whereby both parts rotate together, said member adapted to be ejected under overload, a spring to hold the member elastically in driving engagement including a part whereby said means may be adjusted to carry various loads, means to maintain the separated relation of the parts, a lever operatively engaging one of the clutch parts and adapted to move it into engagement with the other for taking up the load by friction independently of the described member, and mechanism adapted for placing pressure upon the lever and for maintaining pressure thereon whereby a greater or a lesser load may be carried than that for which the spring is set.

8. A clutch comprising two parts, one being the driving and the other the driven member, a member carried by one of the parts adapted to engage the other, a spring elastically holding the member in its engagement, said member adapted to be ejected under overload, means mounted upon the part which carries the member adapted to have movement in both directions about the axis of rotation, a pair of opposed springs bearing in opposite directions upon the member and adapted to hold it in a position midway between its limits of movement, said member including a part lying in the path of movement of the member whereby said member is held disengaged after its ejection, a friction drum included with the said means and lying in position to be engaged in the rotation of the clutch whereby the said means is retarded during such rotation to remove its said part from engagement with the member, one of the last named springs being thus placed under compression and adapted when the said member has been ejected to operate the means to again place its part in the path of movement of the member.

9. In a clutch, the combination of two rotatable clutch parts, a member adapted to connect the two said parts in driving relation and arranged for movement parallel to the axis of its rotation and ejected from one of them under overload, said member having an extension on one of its surfaces, means carried by one of the parts and adapted for a limited movement in either direction about the axis of rotation of the part carrying it and including an extension adapted to have endwise engagement with the extension of the member, a pair of opposed springs acting in opposite directions upon the member and arranged to hold the same midway between the limits of its movements upon said member, the extension of the said means when in the described position lying in the path of movement of the member to engage it after its ejection, said means adapted to be engaged in either direction of its rotation to move it relatively to the member carrying it to shift its extension from behind the extension of the member and permit the latter to reëngage.

10. A clutch comprising two portions, one of them adapted for movement in the direction of the other and each provided with a friction portion adapted to be brought into engagement whereby one of them will gradually take up the load from the other, a lever to move one of the parts into engagement with the other, a member rotatable with one of the parts and adapted to engage the other after the load has been taken up whereby both parts rotate together, means to hold said member elastically in such engagement, said member adapted to be ejected under overload whereby the clutch portions are rendered independent of one another, and means to maintain the ejected position of said member, said means adapted when moved to release said member for permitting its reëngagement.

11. A clutch comprising two portions, one of them adapted for movement in the direction of the other and each provided with a friction portion adapted to be brought into engagement whereby one of them will gradually take up the load from the other, a lever to move one of the parts into engagement with the other, a member rotatable with one of the parts and adapted to engage the other after the load has been taken up whereby both parts rotate together, means to hold said member elastically in such engagement, said member adapted to be ejected under overload whereby the clutch portions are rendered independent of one another, means to maintain the ejected position of said member, and a lever to engage said means for moving it out of the path of the member for permitting that member to reëngage.

12. A clutch comprising in its construction two clutch portions each having a part adapted for frictional engagement, one of said portions adapted for movement in the direction of the other, a lever for moving the portions into frictional engagement, a member adapted for movement parallel to the axis of rotation of the clutch and including extensions adapted to engage both clutch portions whereby both said portions are caused to rotate in unison, means to elastically hold said member in engagement with the clutch portions, said member adapted to be automatically ejected to release the clutch portions from one another under overload, and means adapted to automatically enter behind the member and hold it in its ejected position, the described lever including a part to engage the said means, and also including a part to operatively engage the member for manually terminating the driving relation of the clutch portions.

13. In a clutch, the combination of two clutch portions, a shaft to which one of them is affixed, the other being rotatably mounted thereon including a friction portion, a second friction portion rotatable with the described fixed clutch portion and adapted to have movement relatively to the same in a direction parallel to its axis of rotation, a lever operatively engaging one of the portions adapted for placing both in driving relation, a member rotatable with said fixed clutch portion and having a projection for engaging both said portions and adapted to be automatically ejected under overload from one of them whereby the driving relation of the clutch portions is terminated, means rotatable with the fixed clutch portion including an extension adapted to be carried behind a part of the member when the latter is ejected, a pair of opposed springs each engaging at one end the fixed clutch portion and at its other end engaging the said means, each spring constantly tending to move the extension of said means in the path of the said part of said member, and a lever to frictionally engage said means.

14. In a clutch, the combination of two clutch portions each including a part, one to frictionally engage the other, a member adapted to have movement in a direction parallel to the axis of rotation of the clutch portions and having a projection adapted to engage both said portions and cause them to rotate together, elastic means to move said member into engagement with the portions, said member adapted to be ejected under overload, means to engage and to hold the member in its ejected position, a lever to force one of the friction parts into engagement with the other, and a lever carried by the same adapted to engage the said means and cause its movement relatively to the member in the rotation of the clutch to permit the said member to engage the clutch portions after the latter have reached substantially the same speed of rotation relatively.

15. In a clutch, the combination of two rotatable clutch parts, one of them adapted to rotate relatively to the other, a member mounted upon and rotatable with one of the parts and adapted to have driving engagement with the other of the parts whereby both parts rotate together, and arranged to have movement in a direction parallel to its axis of rotation and also adapted to be disengaged under overload, means to hold the member elastically in engagement with said other part, means also mounted upon one of the parts adapted to rotate with it and arranged to have a movement in both directions about the axis of the part carrying it, and including an extension to be carried into the path of the member to hold it in its disengaged position when ejected, means to elastically hold the last named means substantially midway between its limits of rotative movement and with its extension in said path of movement of the member, a friction device rotatable with each of the clutch parts adapted to be brought into engagement to take up the load, a lever to cause such engagement, and a manually operated part adapted to be moved into engagement with the means having said extension to retard it in its rotation with the clutch part in either direction of rotation to remove its said extension from behind the member and permit the latter to reëngage and carry the load.

16. In a clutch, the combination of two engaging rotatable clutch parts adapted to separate under overload, means rotatable with one of said parts adapted to have rotative movement in either of two directions with respect to said part including a portion to engage said part for holding one of the clutch parts separated from the other, means constantly tending to elastically hold the first said means substantially midway between the limits of its movement, and a manually operated part adapted to engage the said first means during its rotation.

17. In a clutch, the combination of two engaging clutch parts one of them adapted to separate from the other under overload, means rotatable with one of said parts adapted to have rotative movement in either of two directions with respect to the said part, including a portion to engage said part for holding it separated from the other part, a pair of springs engaging the said means and opposed to one another adapted to hold said means elastically midway between its extremes of movement as its position for holding the clutch parts separated, said means adapted to be manually rotated to release the separated clutch part.

In testimony whereof I affix my signature, in presence of two witnesses.

HARVEY V. GIBSON.

Witnesses:
L. M. THURLOW,
W. I. SLEMMONS.